L. SCHNEIDER.
BEDSTEAD FASTENING.
No. 183,779. Patented Oct. 31, 1876.
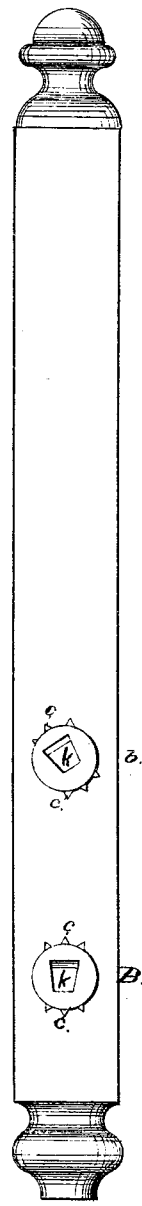
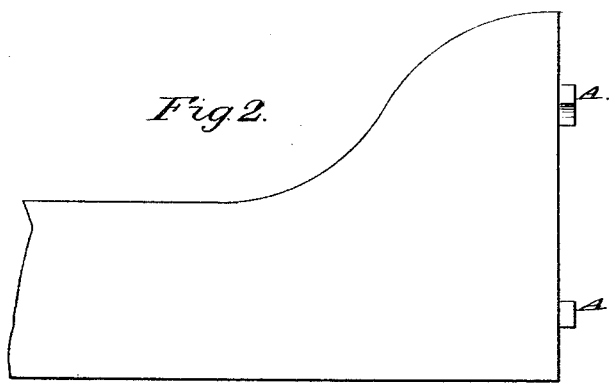
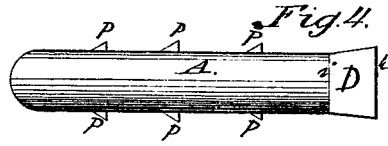

UNITED STATES PATENT OFFICE.

LOUIS SCHNEIDER, OF CARLYLE, ILLINOIS.

IMPROVEMENT IN BEDSTEAD-FASTENINGS.

Specification forming part of Letters Patent No. 183,779, dated October 31, 1876; application filed January 4, 1876.

*To all whom it may concern:*

Be it known that I, LOUIS SCHNEIDER, of Carlyle, in the county of Clinton and State of Illinois, have invented certain new and useful Improvements in Bedstead-Fastening; and I do hereby declare that the following is a full, clear, and exact description thereof, which will enable others skilled in the art to which it pertains to make and use the same, reference being had to the accompanying drawing, and to the letters of reference marked thereon, which form a part of this specification, and in which—

Figure 1 is an end view of a bed-rail, to which the pin of my fastening is attached, and Fig. 2 a side view of the same. Fig. 3 is an elevation of a bed-post, with the socket of my fastening attached thereto, and Figs. 4 and 5 are views of the pin and socket, respectively.

Corresponding parts in the several figures are designated by like letters.

This invention relates to a certain improvement in bedstead-fastenings; and it consists of a pin having its cylindrical portion provided with points which, when the pin is turned after insertion in the bed-rail, secures it in place, and a conical or wedge-shaped head entering a correspondingly-socketed cylinder having oblique peripherical teeth, which, when the cylinder is turned in its socket in the bed-post, retains it firmly in position, substantially as hereinafter more fully set forth.

In the annexed drawing, A refers to the pin having its cylindrical portion, which enters a socket in the bed-rail, provided with a number of points or sharpened projections, P P P, which, when the pin is turned by a winch, or otherwise, penetrate the wood laterally, and secure the pin in place. The pin is inserted in place in the position substantially as indicated in Fig. 1 at $a$, and turned to that indicated at A, same figure. Its head D is of a conical or wedge shape tapering from $h$ to $i$, which allows it to slightly drop when inserted in its socket to fit snugly therein, and effect a secure fastening. B is a cylinder or ring having a socket, $k$, extending from $m$ to $n$, and corresponding in shape with the wedge-shaped head D of the pin, which it receives in locking the parts of the bedstead together. Upon the periphery of the cylinder or ring B are a number of diagonal or spiral teeth, $c\,c$, which, as the cylinder is driven into its socket in the bed-post, penetrate the wood, and give the cylinder a rotary movement, and cause it to rotate from the position shown at $b$ to that shown at B, Fig. 3, in which position it is thus firmly secured in its socket, and is ready to receive the head of the pin in uniting the parts.

Having thus described my invention, what I claim, and desire to secure by Letters Patent, is—

The bedstead-fastening consisting of the pin A, having points or sharpened projections P P P, and wedge-shaped or conical head D, in combination with, and entering, the correspondingly-socketed ring or cylinder B, having oblique peripherical teeth $c\,c\,c$, substantially as described.

In testimony that I claim the foregoing as my own I affix my signature in presence of two witnesses.

LOUIS SCHNEIDER.

Witnesses:
LOUIS ELWONG,
OTTO KOLLME.